(12) United States Patent
Stratman

(10) Patent No.: US 10,895,420 B2
(45) Date of Patent: Jan. 19, 2021

(54) HYBRID FLUID COOLER METHOD AND APPARATUS

(71) Applicant: SPX Cooling Technologies, Inc., Overland Park, KS (US)

(72) Inventor: Jason Stratman, Lee's Summit, MO (US)

(73) Assignee: SPX Cooling Technologies, Inc., Overland Park, KS (US)

( * ) Notice: Subject to any disclaimer, the term of this patent is extended or adjusted under 35 U.S.C. 154(b) by 179 days.

(21) Appl. No.: 15/254,427

(22) Filed: Sep. 1, 2016

(65) Prior Publication Data

US 2018/0058761 A1    Mar. 1, 2018

(51) Int. Cl.
*F28C 1/14* (2006.01)
*F28D 1/047* (2006.01)

(52) U.S. Cl.
CPC ............. *F28C 1/14* (2013.01); *F28D 1/0475* (2013.01)

(58) Field of Classification Search
CPC ...... F28C 1/14; F28C 1/02; F28D 5/02; F28D 1/0475; F28D 5/00
See application file for complete search history.

(56) References Cited

U.S. PATENT DOCUMENTS

| | | | | |
|---|---|---|---|---|
| 3,438,432 A | * | 4/1969 | Bernath | F28D 7/0041 165/138 |
| 3,925,523 A | * | 12/1975 | Cates | F28C 1/14 261/109 |
| 5,540,276 A | * | 7/1996 | Adams | F28D 1/0477 165/150 |
| 5,585,047 A | * | 12/1996 | Mortensen | A62C 3/00 169/54 |
| 7,028,497 B2 | * | 4/2006 | Upton | A47F 3/0408 165/177 |
| 2003/0145619 A1 | | 8/2003 | Word | |
| 2003/0192678 A1 | * | 10/2003 | Stratman | F28D 5/02 165/115 |
| 2005/0183852 A1 | | 8/2005 | Smithey et al. | |
| 2006/0197242 A1 | * | 9/2006 | Stratman | F28C 1/14 261/155 |
| 2009/0266517 A1 | | 10/2009 | Lin | |
| 2010/0107676 A1 | * | 5/2010 | Liu | F25B 39/02 62/304 |

(Continued)

FOREIGN PATENT DOCUMENTS

CN 103080687 A 5/2013
CN 103673661 A 3/2014

(Continued)

OTHER PUBLICATIONS

Search Report issued in European Application No. 17188708.6, dated Jan. 30, 2018.

*Primary Examiner* — Gordon A Jones
(74) *Attorney, Agent, or Firm* — BakerHostetler

(57) ABSTRACT

A hybrid fluid cooler assembly that provides increased heat exchange. The apparatus includes a plurality of adjacently spaced arrays, each array having a plurality of cooling conduits in combination a direct heat exchange portion. In addition, the apparatus includes an airflow inlet that provides a single air flow current that traverses the direct heat exchange portion and then the indirect heat exchange portion in series.

15 Claims, 6 Drawing Sheets

(56) References Cited

U.S. PATENT DOCUMENTS

| | | | | |
|---|---|---|---|---|
| 2012/0012292 A1* | 1/2012 | Bugler, III | ............... | F28D 5/02 |
| | | | | 165/174 |
| 2013/0168881 A1* | 7/2013 | Libert | ................... | F28F 25/087 |
| | | | | 261/112.2 |
| 2016/0363376 A1* | 12/2016 | Aaron | ....................... | F28C 1/14 |
| 2016/0363388 A1* | 12/2016 | Egolf | ....................... | F28F 9/26 |
| 2017/0343307 A1* | 11/2017 | Speckin | .................. | F28F 25/04 |

FOREIGN PATENT DOCUMENTS

| | | |
|---|---|---|
| CN | 204313666 U | 5/2015 |
| CN | 105066734 A | 11/2015 |
| DE | 1812111 | 6/1970 |
| EP | 3056846 A1 | 8/2016 |
| JP | 6-323761 A | 11/1994 |

\* cited by examiner

HYBRID FLUID COOLER METHOD AND APPARATUS

FIELD OF THE INVENTION

The present invention relates to a heat exchanger that utilizes a heat exchange liquid in combination with a heat exchange gas. More particularly, the present invention relates to hybrid fluid cooler having an indirect, closed circuit evaporative heat exchanger in combination with a direct contact heat exchanger utilize to dispose of large quantities of heat generated by various industrial processes.

BACKGROUND OF THE INVENTION

Evaporative heat exchangers are widely used in many applications where it is necessary to cool or condense fluid and/or gas that must be maintained out of contact with the heat exchange medium to which the heat is transferred. For example, air conditioning systems for large buildings employ evaporative heat exchangers for carrying out a portion of the heat exchange that is essential to the cooling process. In these systems, air inside the building is forced passed coils containing a cooled refrigerant gas thereby transferring heat from inside the building into the refrigerant gas. The warmed refrigerant is then piped outside the building where the excess heat must be removed from the refrigerant so that the refrigerant gas can be re-cooled and the cooling process continued. In addition, industrial processes such as chemical production, metals production, plastics production, food processing, electricity generation, etc., generate heat that must be dissipated and/or disposed of, often by the use evaporative heat exchangers. In all of the foregoing processes and numerous other processes that require the step of dissipating or disposing of heat, evaporative heat exchangers have been employed.

The general principle of the evaporative heat exchange process involves the fluid or gas from which heat is to be extracted flowing through tubes or conduits having an exterior surface that is continuously wetted with an evaporative liquid, usually water. Air is circulated over the wet tubes to promote evaporation of the water and the heat of vaporization necessary for evaporation of the water is supplied from the fluid or gas within the tubes resulting in heat extraction. The portion of the cooling water which is not evaporated is recirculated and losses of fluid due to evaporation are replenished.

Conventional evaporative heat exchangers are presently in widespread use in such areas as factory complexes, chemical processing plants, hospitals, apartment and/or condominium complexes, warehouses and electric generating stations. These heat exchangers usually include an upwardly extending frame structure supporting an array of tubes which form a coil assembly. An air passage is formed by the support structure within which the coil assembly is disposed. A spray section is provided usually above the coil assembly to spray water down over the individual tubes of the coil assembly. A fan is arranged to blow air into the air passage near the bottom thereof and up between the tubes in a counter flow relationship to the downwardly flowing spray water. Alternatively, fans located on top may draw air through the heat exchanger before being discharged through the fan. Heat from the fluid or gas passing through the coil assembly tubes is transferred through the tube walls to the water sprayed over the tubes. As the flowing air contacts the spray water on the tubes, partial evaporation of some of the spray water occurs along with a transfer of heat from the spray water to the air. The air then proceeds to flow out of the heat exchanger system. The remaining unevaporated spray water collects at the bottom of the conduit and is pumped back up and out through the spray section in a recirculatory fashion.

Current practice for improving the above described heat transfer process includes increasing the surface area of the heat exchange tubes. This can be accomplished by increasing the number of coil assembly tubes employed in the evaporative heat exchanger by "packing" the tubes into a tight an array as possible, maximizing the tubular surface available for heat transfer. The tightly packed coils also increase the velocity of the air flowing between adjacent tube segments. The resulting high relative velocity between the air and water promotes evaporation and thereby enhances heat transfer.

Another practice currently employed to increase heat transfer surface area is the use of closely spaced fins which extend outwardly, in a vertical direction from the surface of the tubes. The fins are usually constructed from a heat conductive material, where they function to conduct heat from the tube surface and offer additional surface area for heat exchange.

In addition, another method currently used to increase heat exchange is the use of a direct heat exchange section in from of splash type fill structures or film type packs positioned in a vertical relationship with the coil assembly.

These current practices can have drawbacks. For example, the use of additional tubes requires additional coil plan area along with increased fan horsepower needed to move the air through the tightly packed coil assembly, increasing unit cost as well as operating cost. In addition, placement of fins between the individual tubes may make the heat exchanger more susceptible to fouling and particle build up.

Accordingly, it is desirable to provide a method and apparatus for effectuating, evaporative heat exchange that can offer improved efficiency and or without undesirably increasing the size of the unit, the manufacturing cost of the unit, and/or operating cost of the unit.

SUMMARY OF THE INVENTION

The foregoing needs are met, at least in part, by the present invention where, in one embodiment, a hybrid fluid cooler apparatus that extends along a longitudinal axis for use in a heat exchange processes is provided, comprising: a frame assembly comprising: a first end wall; a second end wall that opposes said first end wall; a first side wall that extends between said first and second end walls; a second side wall that opposes said first side wall that extends between said first and second end walls; a direct heat exchange section oriented at a first position along the longitudinal axis; an indirect heat exchange section oriented at a second location along the longitudinal axis, in series above said direct heat exchange section, wherein said indirect heat exchange section comprises a plurality of generally vertical arrays adjacently spaced laterally to each other, said arrays each comprising a plurality of generally horizontal conduits having a diameter that extend across the fluid cooler assembly in spaced relation to each other at different vertical levels of the fluid cooler assembly; and an airflow inlet oriented at a position below said direct heat exchange section along the longitudinal axis that provides a single air flow current wherein said single airflow current traverses through said direct heat exchange and said indirect section in series.

In accordance with another embodiment of the present invention, a hybrid heat exchange apparatus for use in a fluid cooler having a longitudinal axis provided, comprising: a direct heat exchange section oriented at a first position along the longitudinal axis, wherein said direct heat exchange section comprises heat exchange packs; an indirect heat exchange section oriented at a second location along the longitudinal axis, in series above said direct heat exchange section, wherein said indirect heat exchange section comprises a plurality of generally vertical arrays adjacently spaced laterally to each other, said arrays each comprising a plurality of generally horizontal conduits having a diameter that extend across the fluid cooler assembly in spaced relation to each other at different vertical levels of the fluid cooler assembly; and an airflow inlet oriented at a position below said direct heat exchange section along the longitudinal axis that provides a single air flow current wherein said single airflow current traverses through said direct heat exchange and said indirect section in series.

In still another embodiment of the present invention, a method for cooling a fluid or gas using a hybrid fluid cooler is provided, comprising: flowing a fluid to be cooled through an indirect heat exchange assembly having a plurality of generally vertical arrays adjacently spaced laterally to each other, the arrays each comprising a plurality of generally horizontal conduits extending across the heat exchange assembly in spaced relation to each other at different vertical levels of the heat exchange assembly; spraying a heat exchange fluid onto conduits and a direct heat exchange section positioned above the indirect heat exchange section; and passing a single air flow current over the indirect heat exchange section and the direct section in series.

In accordance with yet another embodiment of the invention, a method for cooling a fluid or gas using a hybrid fluid cooler is provided, comprising: flowing a fluid to be cooled through an indirect heat exchange assembly having a plurality of generally vertical arrays adjacently spaced laterally to each other, the arrays each comprising a plurality of generally horizontal conduits extending across the heat exchange assembly in spaced relation to each other at different vertical levels of the heat exchange assembly; spraying a heat exchange fluid onto conduits and a direct heat exchange section positioned below the indirect heat exchange section; and passing a single air flow current over the direct heat exchange section and the indirect section in series.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF PREFERRED

Embodiments of the Invention

Figure 1:
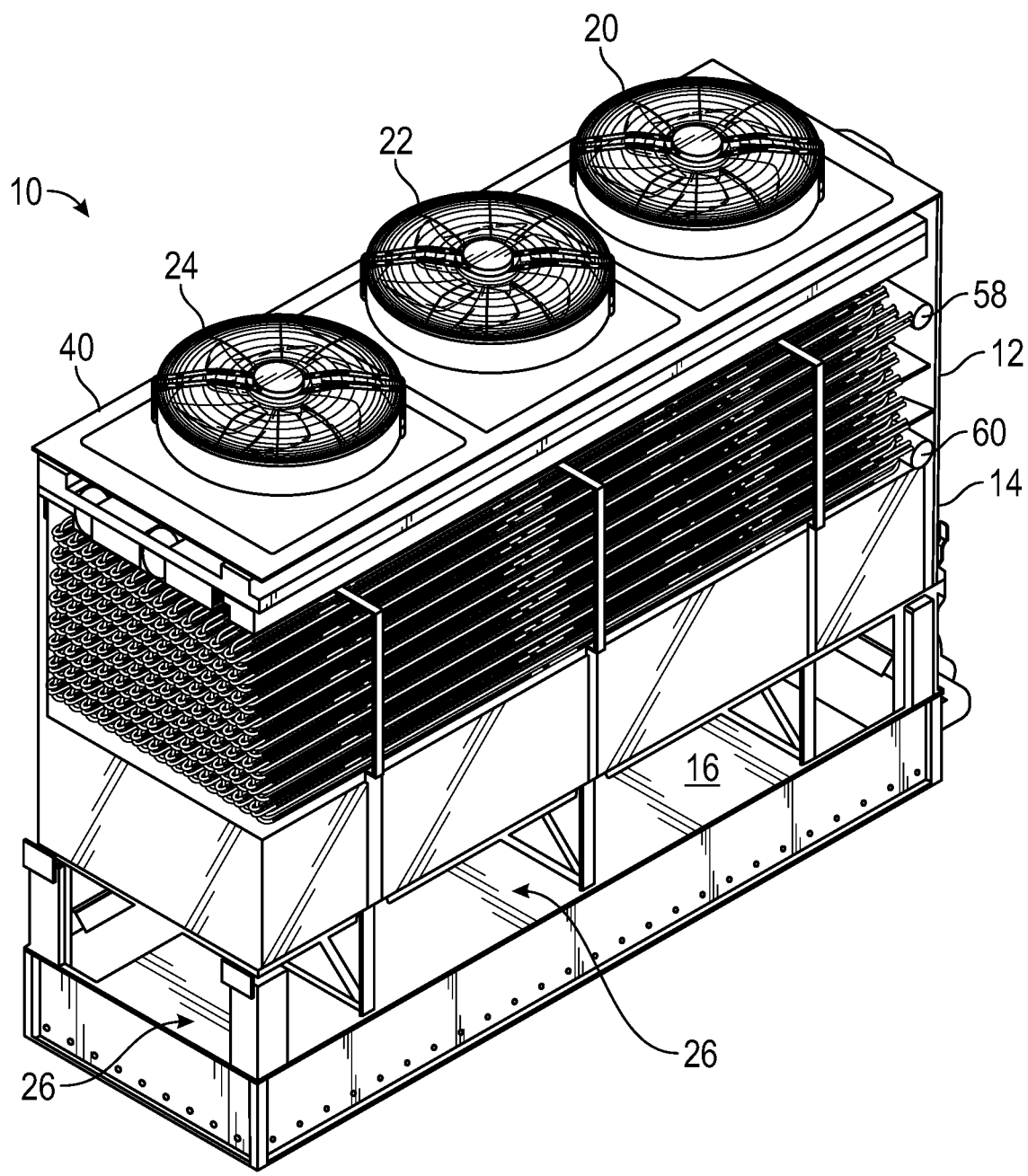
FIG. 1 is a an isometric view of a hybrid fluid cooler employing a heat exchange coil circuit and pack heat exchange section in accordance with an embodiment of the present invention.

Referring now to FIG. 1 of the drawings, a hybrid fluid cooler, generally designated 10, is illustrated in accordance with an embodiment of the present invention. Generally, the hybrid fluid cooler 10 includes a tower frame or structure having a serpentine, multi-circuit coil indirect evaporative fluid cooling section 12, a direct evaporative heat exchange section 14, a cooling liquid collection basin 16, and a cooling liquid distribution assembly 18 (see FIG. 2). The hybrid fluid cooler 10 also includes a series of air current generators 20, 22, 24 that move or generate a single stream or current of air into the hybrid fluid cooler 10 via an air inlet 26. The air current generators 20, 22, 24 are preferably fans and may vary in number and size depending upon hybrid fluid cooler 10 size and application.

Figure 2:
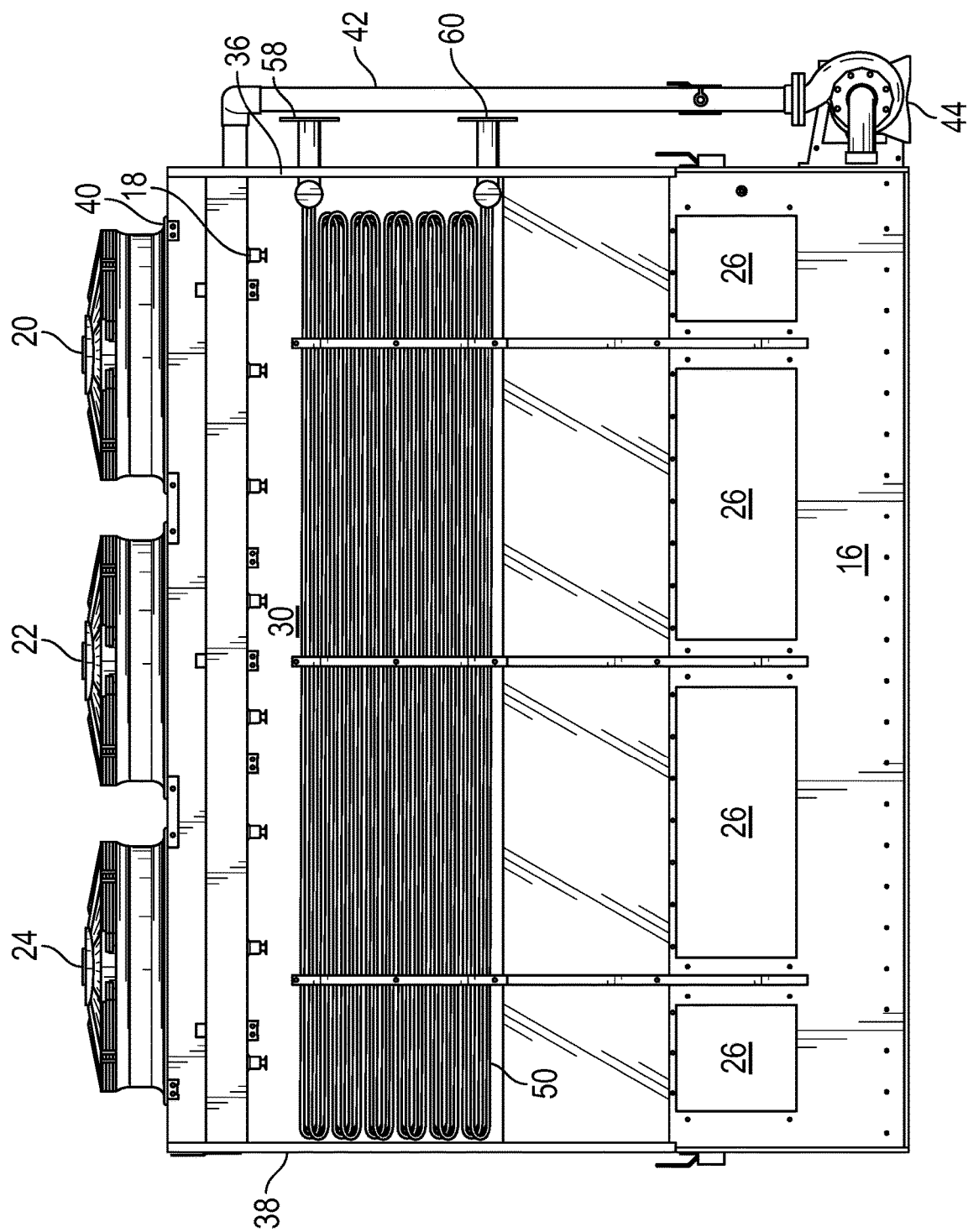
FIG. 2 is a cutaway, partial side view of the hybrid fluid cooler depicted in FIG. 1 in accordance with an embodiment of the present invention.
Figure 3:
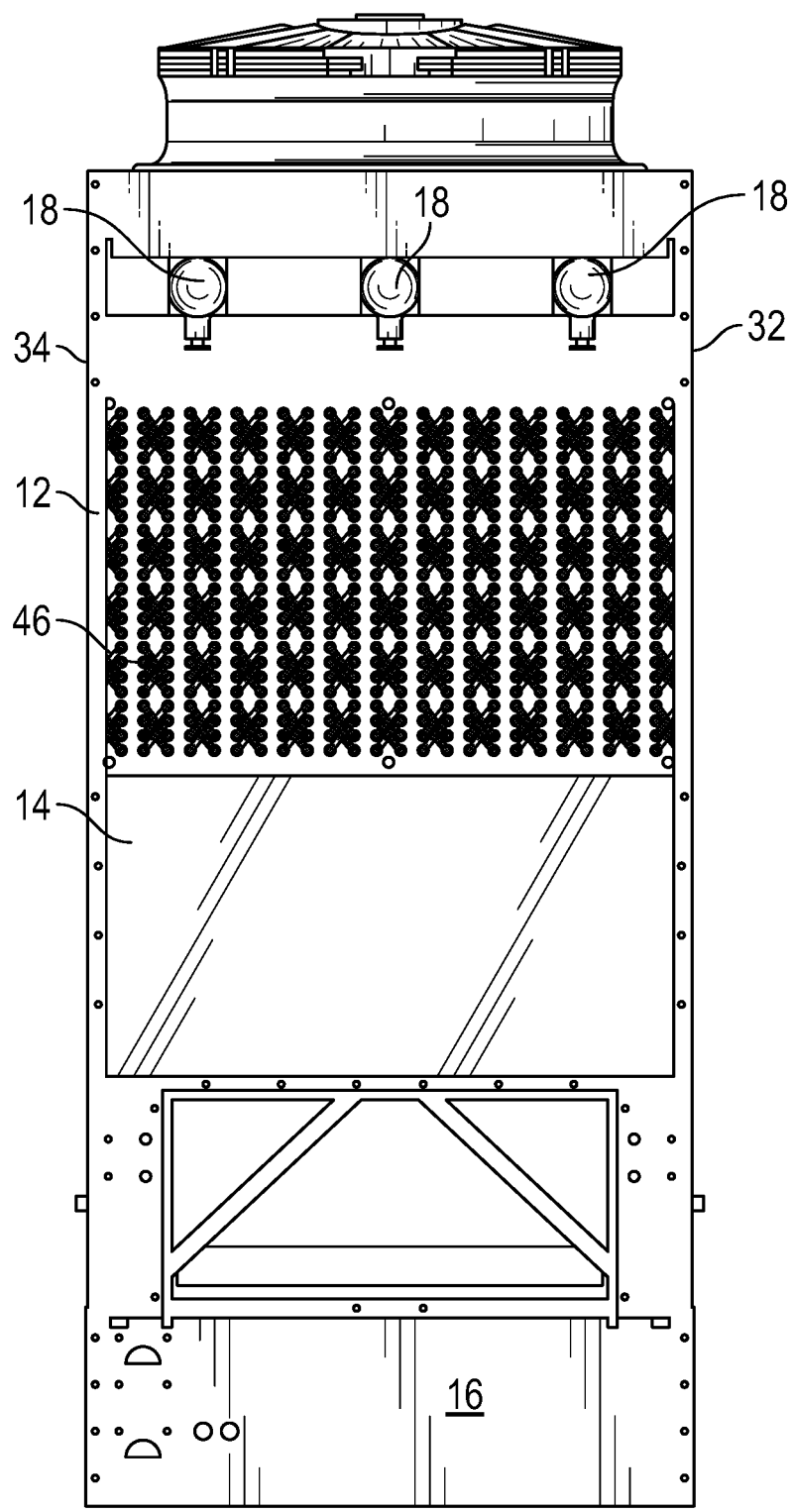
FIG. 3 is a an end view of a hybrid fluid cooler, in accordance with an embodiment of the invention.

As illustrated in FIGS. 1-3, the hybrid fluid cooler 10 is generally rectilinear in geometry having an interior space or vertical passage 30 that is of generally rectangular, uniform cross-section. The above-described geometry is defined by vertical front and rear walls 32, 34 and vertical side walls 36, 38. The walls 32, 34, 36, 38, extend upwardly from the basin. The side walls 32, 34 and front and rear walls 36, 38 combine to form the interior 30 within which the air passage, the cooling fluid spray assembly 18, the indirect heat exchange assembly 12 and the direct heat exchange assembly 14 are located. The cooling air current generators 20, 22, 24 are preferably positioned on the top wall or fan deck 40.

The walls and other structural elements that form the interior 30 and framing structure of the hybrid fluid cooler 10 are preferably formed from mill galvanized steel, but may be composed of other suitable materials such as stainless steel, hot dipped galvanized steel, epoxy coated steel, and/or fiber reinforced plastics (FRP).

As shown in FIG. 2, a recirculation loop 42 is located on the side wall 36 and extends between a first and second recirculation port (not pictured) and a recirculation pump 44. The lower port extends through the wall 36 and into the collection basin located in the base 16. The recirculation piping system 42 extends from collection basin 16 through pump 44, then vertically to return the cooling fluid to the spray assembly 18.

The cooling fluid spray assembly 18 includes a plurality of conduits and nozzles positioned directly above the coil assembly 12 for distribution of a cooling liquid, preferably water, onto the individual coil arrays 46 (see FIG. 4) of the coil assembly 12. The water is supplied to the coil assembly 12 by way of the piping system 42.

Figure 4:
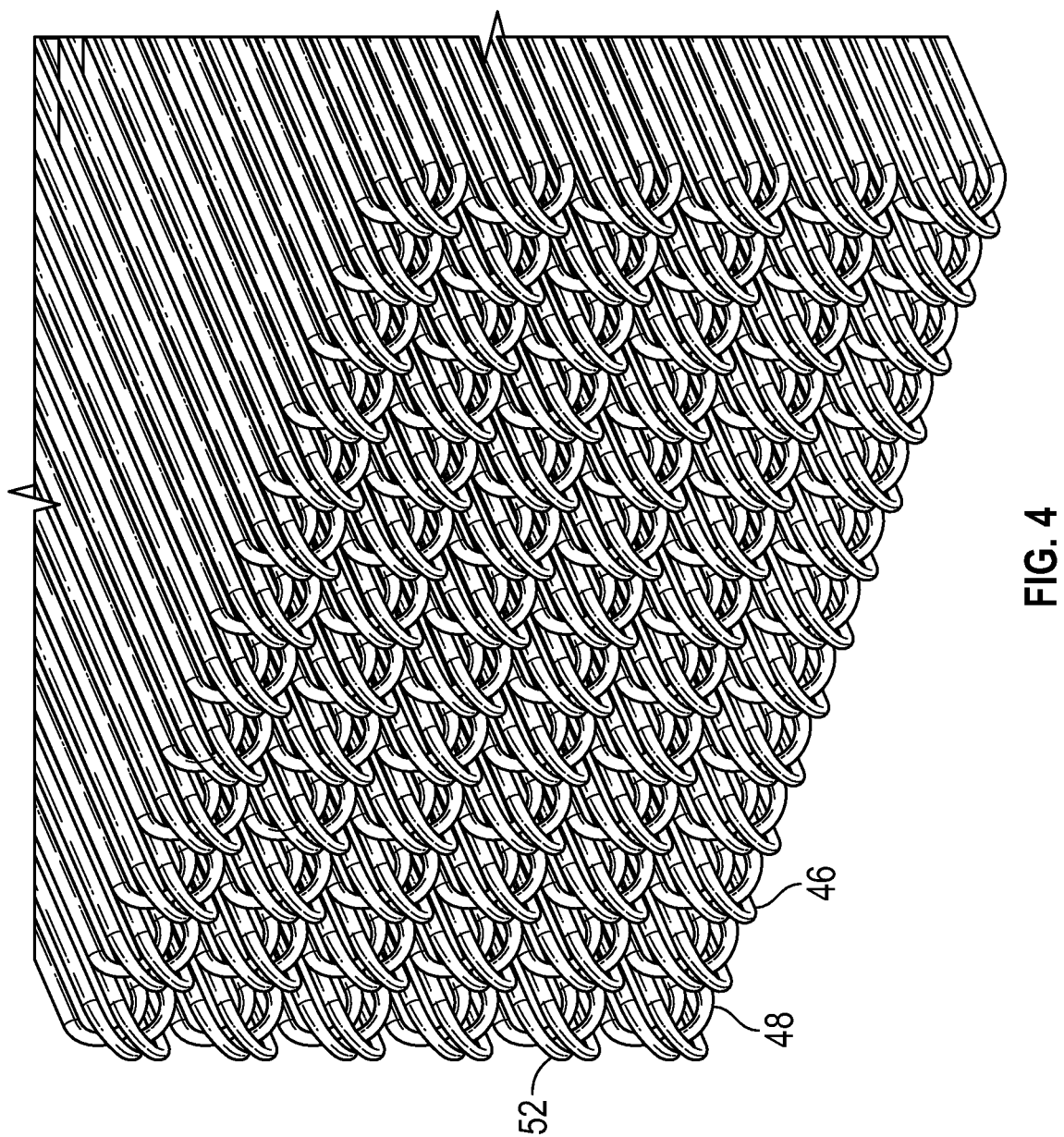
FIG. 4 is a detailed, partial view of coil arrays in accordance with embodiment of the present invention.
Figure 5:
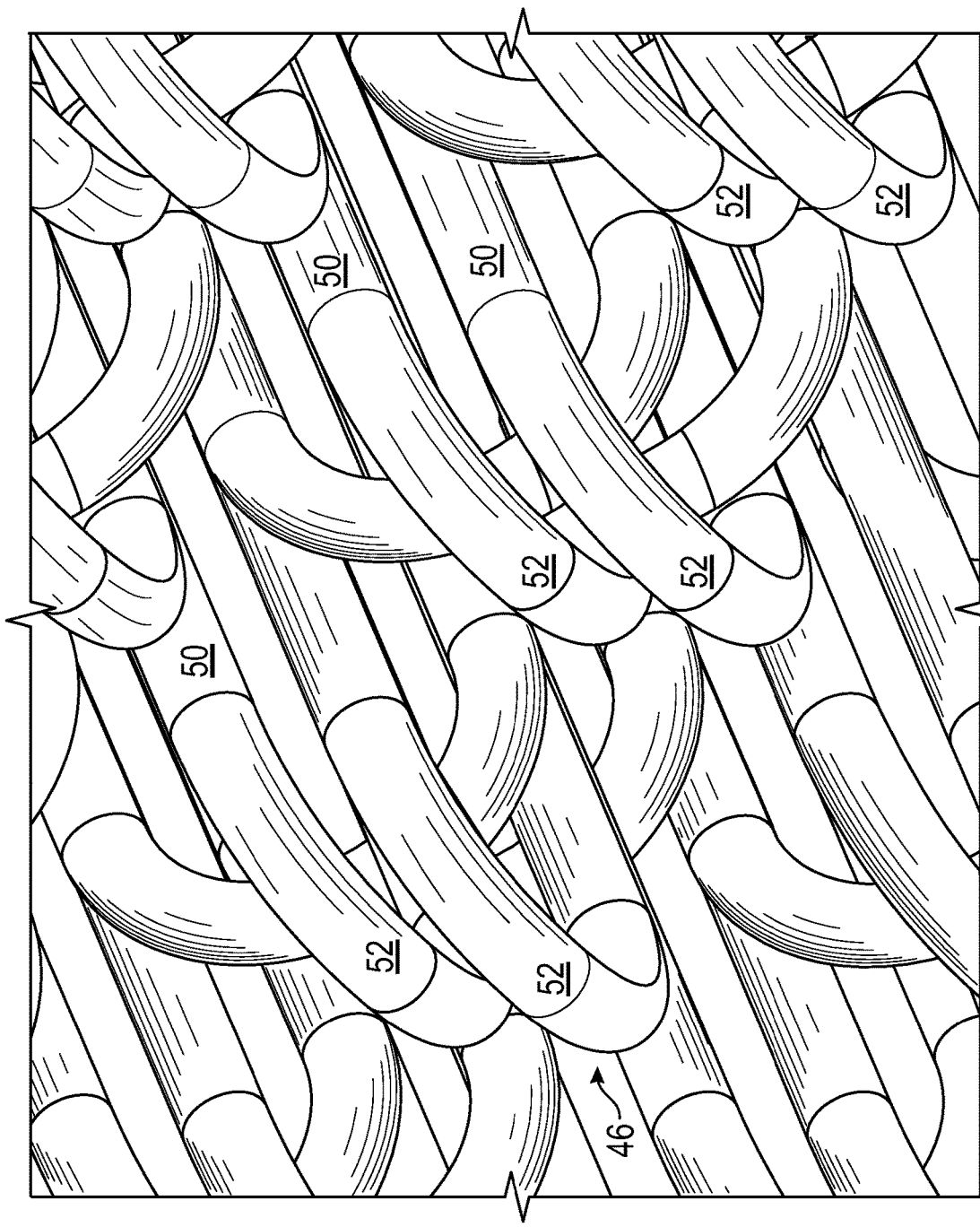
FIG. 5 is another partial view of the coil arrays in accordance with embodiment of the present invention.
Figure 6:
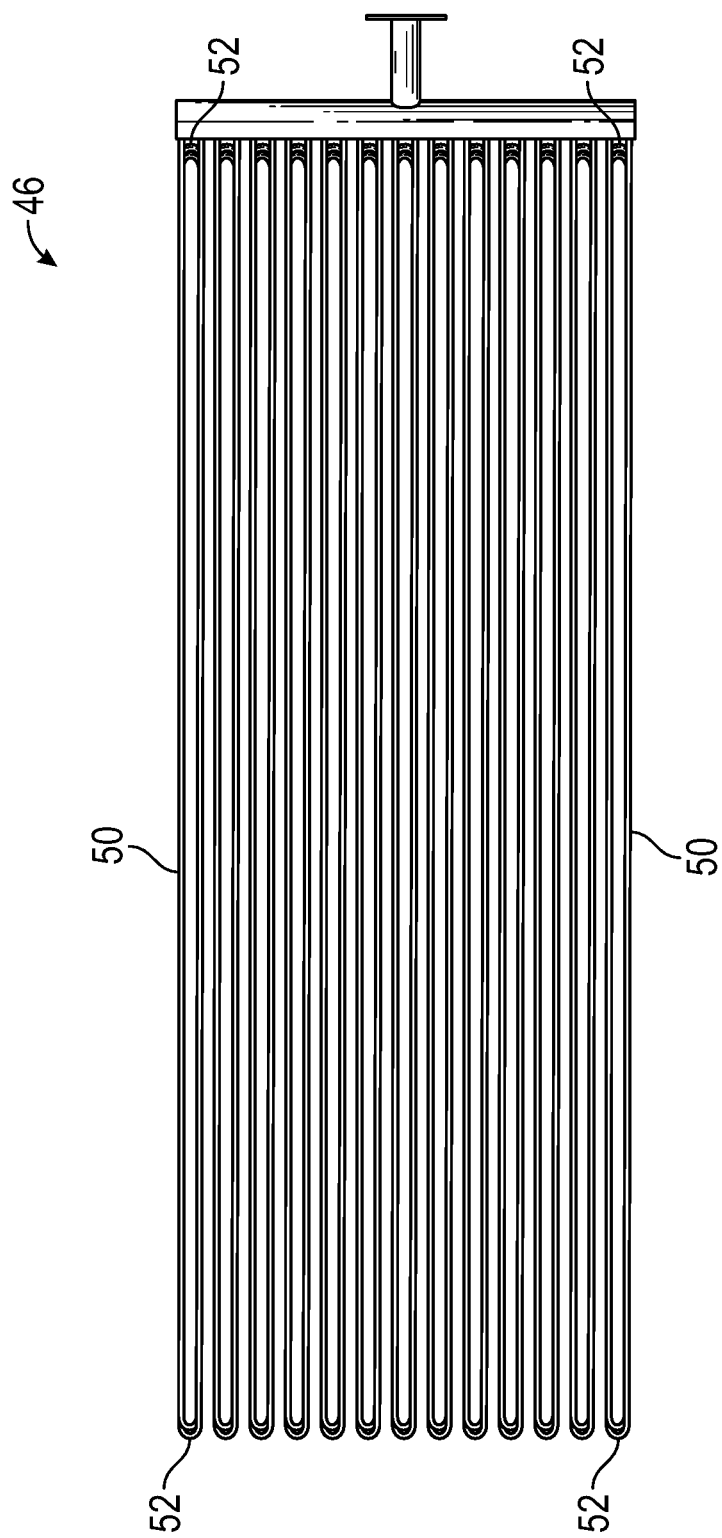
FIG. 6 is a top view of a coil assembly in accordance with an embodiment of the present invention.

Referring now particularly to FIGS. 2, 4 and 5, the coil assembly 12 includes a plurality of the individual vertical coil arrays 46. The coil assembly 12 has a lower inlet manifold 60 for distributing the fluid to be cooled to the various coil arrays 46 along with an upper outlet manifold 58 for returning cooling fluid from the coil arrays 46 to the process in which it is used. If the process fluid is to be condensed, the inlet manifold would be at the top 58 and the outlet manifold would be at the bottom 60. As can be seen in the figures, the indirect section 12, or the coils that make up said section, is mounted or oriented in vertical alignment above the direct heat exchange section 14.

As can be observed specifically in FIGS. 1-4, each coil array 46 is preferably in the form of a cooling circuit 48 bent into a plurality of generally horizontal conduits 50. Each horizontal conduit 50 is connected to its counterparts above and/or below in the array by way of u-bend sections 52. Each array 46 carries fluid from the lower manifold 60 to the upper manifold 58. The u-bends 52 and horizontal conduits 50 preferably form a serpentine arrangement for each array having 180 degree bends near each of the front and rear walls 36, 38. The aforementioned arrangement results in each array extending generally horizontally across the interior 30 of the hybrid fluid cooler 10 in a back and forth orientation at different levels along a vertical plane. Each array is parallel to additional, laterally spaced adjacent arrays 46 that make up the coil assembly 12.

As illustrated in FIGS. 3-5, the individual conduits of the tube array 12 are arranged in vertical columns with a relatively wide space between columns of tubes (no staggering of tubes). This tube arrangement provides a very low pressure drop for the air traversing vertically through the indirect heat exchange coil section 12. The U-bends 52 preferably have a three inch (3") dimension which corresponds to the centerline diameter of the return bends 52 at the tube centerlines. Typically, in one embodiment of the present invention, the vertical spacing of the tubes is substantially less than three inches (3"). This "close vertical spacing arrangement" is allowed by crossing over of said conduits from one column to another rather than the more customary practice of keeping the U-bend in a vertical plane. However, alternatively, other embodiments of the present invention may incorporate tubes or conduits wherein the bend sections have diameters that are greater than three inches or less than three inches. Moreover, other embodiments encompassed by the present invention include u-bend section that do not cross as previously discussed, but are oriented in vertical columns having varying dimension sizes.

The above-described orientation of the indirect heat exchange section 12 and direct heat exchange section 14 wherein the indirect section 12 is positioned vertically above the direct section 14 is one preferred embodiment only. Alternatively, the present invention may include orientations or embodiments wherein the direct heat exchange section is positioned vertically below the direct heat exchange section and extends between the inlet and the base of the direct section.

In a preferred embodiment of the present invention the centerline to centerline spacing between horizontally adjacent conduits in one embodiment may be approximately 1.875 inches. More generally, the horizontal spacing between vertically adjacent conduits is about one and a half (1.5) to about five (5) times the diameter of the conduits centerline to centerline. More preferably the centerline to centerline spacing is approximately three (3) tube diameters.

Turning to the vertical spacing of the conduits, such spacing may vary as desired and depending upon application. For example, in one embodiment of the present invention the centerline to centerline vertical spacing may range from approximately one inch (1) to two inches (2) or about two (2) to about four (4) diameters. In yet another embodiment of the present invention, the tubes are ⅝" in diameter with a vertical spacing between vertically adjacent conduits of approximately one inch (1") to approximately three inches (3") centerline to centerline. Alternatively, in yet another embodiment of the present invention, the centerline to centerline vertical spacing may be such that little or no clearance exists between vertically adjacent conduits. In such arrangements, vertically adjacent conduits will abut or contact one another and be in fluid communication with one another via a header or feed line that extends vertically or normal to the conduits and attaches to the conduits at their respective ends.

The conduits 50 are preferably formed from copper alloy, however other materials suitable for conducting heat energy such as aluminum, steel and/or stainless steel derivatives may be utilized. As depicted, the conduits 50 are cylindrical in shape, however the tubes may vary in shape for example, square, oval, or rectangular. In addition, the cooling arrays 46 may vary in diameter. Although unitary tubes 50 are preferred, the horizontal conduits 50 may be individual tubes with a connector at each end providing fluid connection between vertically adjacent conduits. Also, the conduits 50 are preferably generally parallel to one another and generally horizontal. References to parallel and/or horizontal in this application refer to generally or substantially parallel and do not indicate any particular degree of the same.

The direct evaporative heat exchange section 14 extends vertically between the basin 16 and the indirect heat exchange section 12. As previously mentioned, the direct evaporative heat exchange 14 section comprises a fill pack or fill packs comprising film fill sheets. The fill sheets are preferably a textured relatively thin sheet formed from polyvinyl chloride (PVC) or light metallic material.

The fill sheets that make up the fill pack may be hung from beams (not shown) which are connected to and traverse sidewalls 20 and 22 or the fill packs may be positioned on ledges or flanges that encircle the interior 30. The film fill sheets may have a generally continuous, waved pattern of grooves or patterns running the entire vertical extent of the sheet which aid in spreading the hot water into a thin film, which creates additional surface area for the air to interact with and evaporatively cool the water.

During operation of the hybrid fluid cooler 10, a fluid to be cooled or condensed from an offsite process, such as water or gas, flows into the hybrid fluid cooler 10 via the inlet port 60. This fluid is then distributed by the upper manifold to the individual arrays 46 that make up the coil assembly 12 of the indirect heat exchange section 12. The fluid to be cooled then proceeds to flow through the various conduits 50, back and forth across the interior 13 of the hybrid fluid cooler 10 at different levels therein until it reaches the upper manifold where it is transferred out of the evaporative heat exchanger 10. As the fluid to be cooled flows through the coil assembly 12, an evaporative liquid such as water is sprayed downwardly from the spray assembly 18 onto the indirect heat exchange section 12 and conduits 50 of each, separate array 46.

The cooling liquid next exits the indirect cooling section 12 and proceeds to enter the direct heat exchange section 14 where it is distributed uniformly across each fill sheet of the respective fill packs that make up the indirect heat exchange section 14. As previously mentioned, the direct evaporative heat exchange 14 section comprises a fill pack or fill packs comprising individual film fill sheets. The fill sheets are preferably a textured relatively thin sheet formed from polyvinyl chloride (PVC) or light metallic material. As illustrated, the fill packs extend the entire longitudinal length of the structure between the front and rear walls 36 and 38. The cooling fluid then exits the fill pack where it collects in the basin 16.

As the cooling fluid traverses the indirect and direct heat exchange sections 12, 14 as discussed above, the air current generators 20, 22, 24 produce a single, air flow current that enters the hybrid fluid cooler via the air inlet 26. Said single air flow current enters the fluid cooler 10 via the inlet 26 as previously mentioned, and proceeds to enter the lower portion of the direct heat exchange section 14. As the single air flow stream flows or traverses through the fill packs, it flows over and through the individual film fill sheets that make up the direct heat exchange section 14. The air flow stream flows over the fill sheets and contacts the cooling liquid flowing downwardly there over and cools the heated water that has indirectly exchanged heat with the fluid or gas flowing through the conduits of the indirect heat exchange section 12.

The single air flow stream next exits the direct heat exchange section 14 and proceed to enter the indirect heat exchange section 12. As the air flow stream is traversing the conduit array 46, the fluid or gas travels through the conduits concurrently and the fluid to be cooled gives up heat to the conduit walls of the conduits. The heat passes outwardly through the walls to the water flowing over the outer surface of the conduit. Meanwhile the water is simultaneously coming into evaporative contact with the upwardly moving air of the single air flow stream and the water gives up heat to the air both by normal contact transfer and by partial evaporation.

As discussed above, the single air flow stream likely has its highest temperature as a result of passing through the direct contact fill section. In one instance or example, as the air flows into the indirect, coil section, it is possible the air temperature is higher than the water film temperature and the air is also losing heat to the water film. Accordingly, as disclosed in the present invention the wide gap between conduits minimizes the air contact in the coils of the indirect section, helping to improve the overall heat rejection of the coils of the indirect section.

The above-described flow of a single air flow stream through the direct heat exchange section 14 first, and the indirect section 12, in series, provides an improved heat exchange process by increasing the heat exchange capabilities and affording the process to be more efficient. The addition of direct heat exchanged fill pack 12 functions to provide increased heat exchange capability by cooling the heat exchange water. This, in combination with the spacing of the cooling tubes as previously described, creates clear vertical sight lines through the coil assembly 11. This results in an increased, more efficient heat transfer without requiring increased coil plan area and/or air current generator horsepower.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention. For example the direct section 14 could be placed above indirect section 12 and still maintain the advantages of the invention with the relative low pressure drop of the air through indirect section 12 and water cooling in the direct section 14.

What is claimed is:

1. A hybrid fluid cooler apparatus that extends along a longitudinal axis for use in a heat exchange processes, comprising:
    a frame assembly comprising:
        a first end wall;
        a second end wall that opposes said first end wall;
        a first side wall that extends between said first and second end walls;
        a second side wall that opposes said first side wall that extends between said first and second end walls;
    a direct heat exchange section having a plurality of fill sheets and oriented at a first position along the longitudinal axis;
    an indirect heat exchange section oriented at a second position along the longitudinal axis, in series with said direct heat exchange section, wherein said indirect heat exchange section comprises a plurality of vertical arrays adjacently spaced laterally to each other, said plurality of vertical arrays each comprising a plurality of horizontal conduits having a diameter that extend across the hybrid fluid cooler apparatus in spaced relation to each other at different vertical levels of the hybrid fluid cooler apparatus, wherein a horizontal spacing between said horizontal conduits within said vertical arrays is three (3) times the diameter centerline to centerline of said conduits; and
    an airflow inlet oriented at a position below said direct heat exchange section along the longitudinal axis that provides entry for a single air flow current wherein said single airflow current traverses through said direct heat exchange section and said indirect section in series, wherein the plurality of fill sheets are disposed below the entire indirect heat exchange section.

2. The hybrid fluid cooler apparatus according to claim 1, further comprising a fluid collection basin, wherein said fluid collection basin is positioned vertically below said airflow inlet along the longitudinal axis.

3. The hybrid fluid cooler apparatus according to claim 2, further comprising a top wall that opposes said fluid collection basin, wherein said top wall extends between said first and second side walls and said first and second end walls.

4. The hybrid fluid cooler apparatus according to claim 3, wherein said top wall is a fan deck.

5. The hybrid fluid cooler apparatus according to claim 4, further comprising at least one air current generator positioned on said fan deck.

6. The hybrid fluid cooler apparatus according to claim 1, wherein said diameter is ⅝ inches.

7. The hybrid fluid cooler apparatus according to claim 1, wherein said conduits are formed from a material capable of conducting heat energy.

8. The hybrid fluid cooler apparatus according to claim 7, wherein the material is copper.

9. The hybrid fluid cooler apparatus according to claim 1, wherein said direct heat exchange section comprises film fill packs.

10. The hybrid fluid cooler apparatus according to claim 9, wherein said film fill packs are counter flow film fill packs.

11. The hybrid fluid cooler apparatus according to claim 1, wherein said first position is located vertically above said second position along the longitudinal axis.

12. A hybrid heat exchange apparatus for use in a fluid cooler having a longitudinal axis, comprising:
   a direct heat exchange section having a plurality of fill sheets and oriented at a first position along the longitudinal axis, wherein said direct heat exchange section comprises heat exchange packs;
   an indirect heat exchange section oriented at a second location along the longitudinal axis, in series with said direct heat exchange section, wherein said indirect heat exchange section comprises a plurality of vertical arrays adjacently spaced laterally to each other, said arrays each comprising a plurality of horizontal conduits having a diameter that extend across the fluid cooler in spaced relation to each other at different vertical levels of the fluid cooler, wherein a horizontal spacing between said horizontal conduits within said vertical arrays is three (3) times the diameter centerline to centerline of said conduits; and
   an airflow inlet oriented at a position below said direct heat exchange section along the longitudinal axis that provides entry for a single air flow current wherein said single airflow current traverses through said direct heat exchange section and said indirect heat exchange section in series, wherein the plurality of fill sheets are disposed below the entire indirect heat exchange section.

13. The hybrid heat exchange apparatus according to claim 12, wherein the lateral spacing between adjacent vertical arrays of said plurality of vertical arrays is 1.875 inches from centerline to centerline.

14. A method for cooling a fluid using a hybrid fluid cooler, comprising:
   flowing the fluid to be cooled through an indirect heat exchange assembly having a plurality of vertical arrays adjacently spaced laterally to each other, the arrays each comprising a plurality of horizontal conduits extending across the indirect heat exchange assembly in spaced relation to each other at different vertical levels of the indirect heat exchange assembly, wherein a horizontal spacing between said horizontal conduits within said vertical arrays is three (3) times the diameter centerline to centerline of said conduits;
   spraying a heat exchange fluid onto the conduits and a direct heat exchange section having a plurality of fill sheets and positioned below the indirect heat exchange assembly; and
   passing a single air flow current over the direct heat exchange section and the indirect heat exchange assembly in series, wherein the plurality of fill sheets are disposed below the entire indirect heat exchange section.

15. A method for cooling a fluid using a hybrid fluid cooler, comprising:
   flowing a fluid to be cooled through an indirect heat exchange assembly having a plurality of vertical arrays adjacently spaced laterally to each other, the arrays each comprising a plurality of horizontal conduits extending across the indirect heat exchange assembly in spaced relation to each other at different vertical levels of the indirect heat exchange assembly, wherein a horizontal spacing between said horizontal conduits within said vertical arrays is three (3) times the diameter centerline to centerline of said conduits;
   spraying a heat exchange fluid onto a direct heat exchange section having a plurality of fill sheets and positioned above the indirect heat exchange assembly; and
   passing a single air flow current over the indirect heat exchange assembly and the direct heat exchange section in series, wherein the plurality of fill sheets are disposed below the entire indirect heat exchange section.

* * * * *